S. KADLA.
FISHING REEL.
APPLICATION FILED JULY 6, 1911.
1,023,853.
Patented Apr. 23, 1912.
2 SHEETS—SHEET 1.
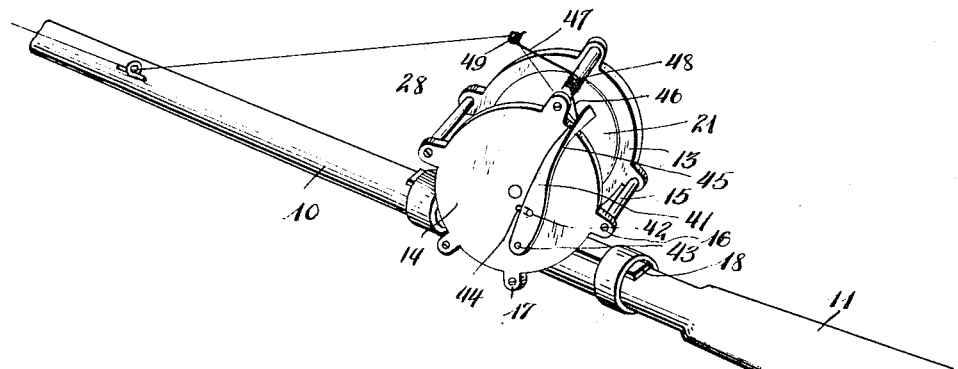
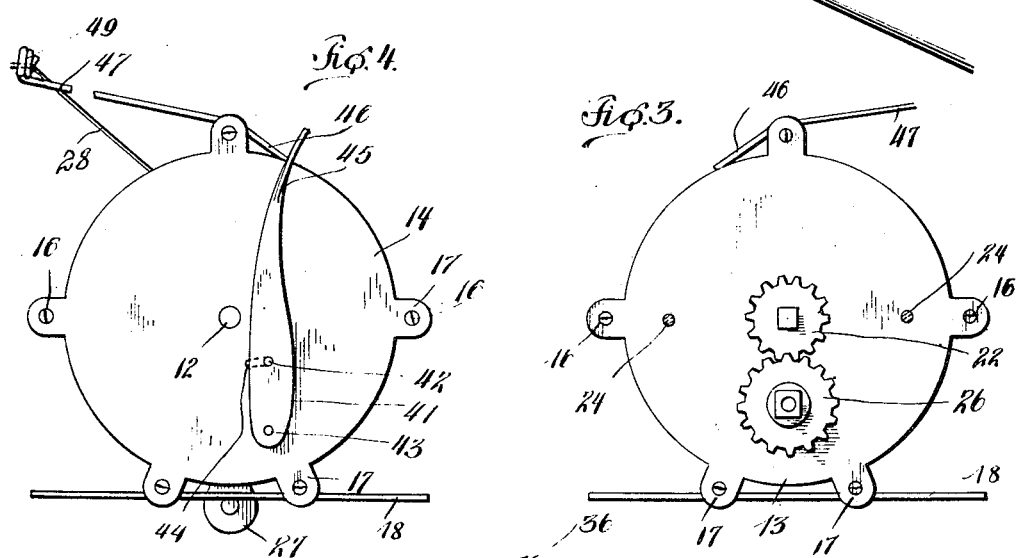
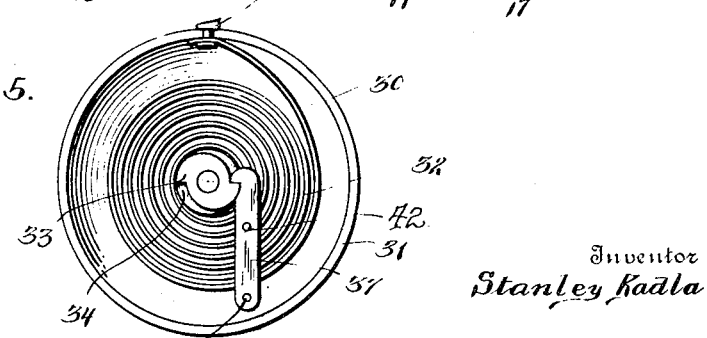
Witnesses
Ernest Crocker
Edwin Burch
Inventor
Stanley Kadla
By Chandler & Chandler
Attorneys

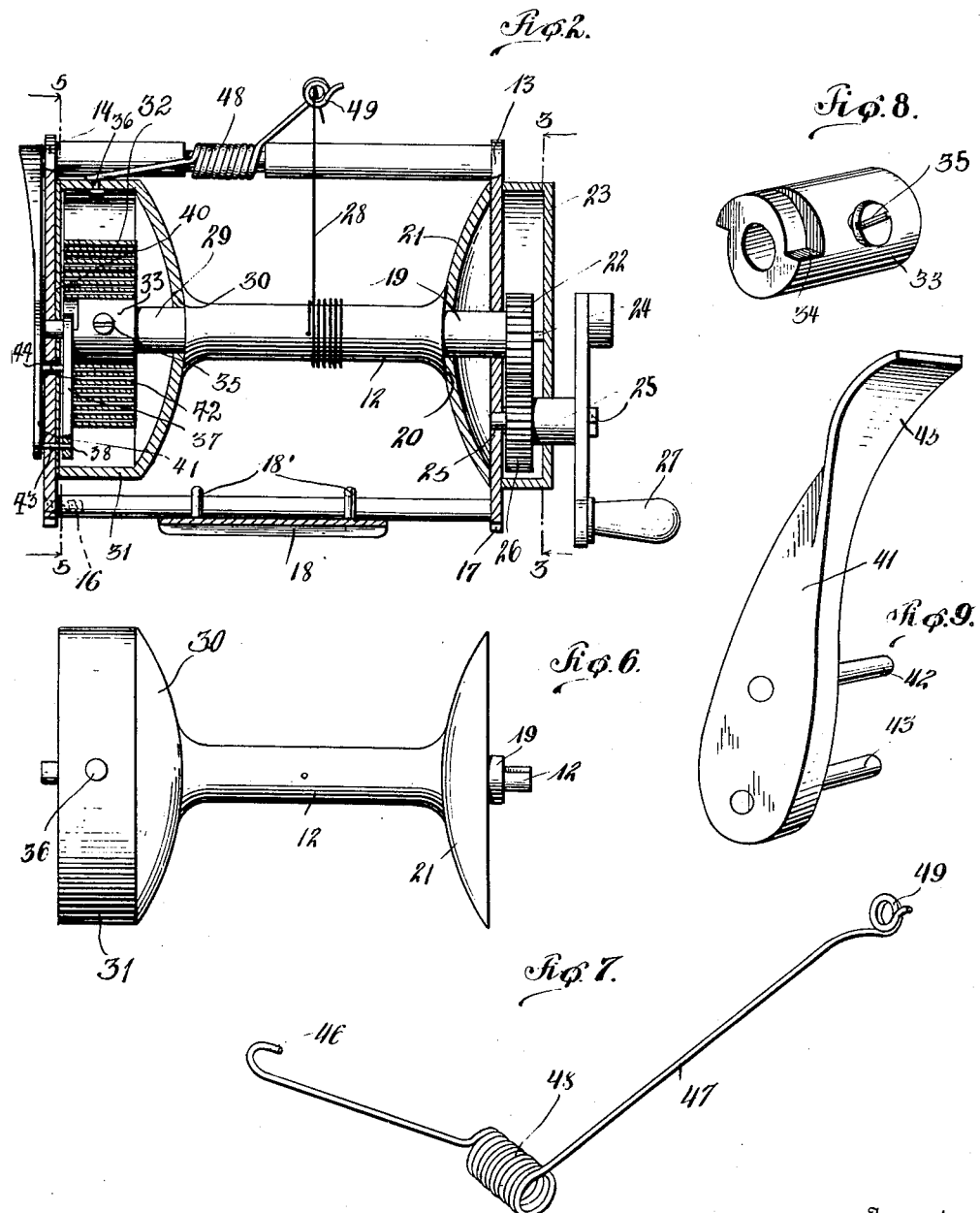

UNITED STATES PATENT OFFICE.

STANLEY KADLA, OF TULLISVILLE, SASKATCHEWAN, CANADA.

FISHING-REEL.

1,023,853. Specification of Letters Patent. Patented Apr. 23, 1912.

Application filed July 6, 1911. Serial No. 637,161.

*To all whom it may concern:*

Be it known that I, STANLEY KADLA, a subject of the King of England, residing at Tullisville, in the Province of Saskatchewan, Dominion of Canada, have invented certain new and useful Improvements in Fishing-Reels; and I do hereby declare the following to be a full, clear, and exact description of the invention, such as will enable others skilled in the art to which it appertains to make and use the same.

This invention relates to reels adapted to be used in connection with fishing poles and the object of the invention is to provide a reel adapted to be actuated to wind the fishing line thereon when a fish bites at the bait, thus making the catch more certain.

The specific object of the invention is to provide a novel reel construction which may be rotated to wind the line thereon in the usual manner and which also is provided with a spring actuating mechanism and release adapted to be thrown out of operation when pull is exerted upon the line when a fish bites at the bait.

With these and other objects in view the invention consists of certain other combinations and arrangements of parts as will be hereinafter more fully described and claimed, it being a still further object to provide a device which will not be likely to get out of working order.

In the drawings:—Figure 1 is a perspective view of a fishing rod having my improved fishing reel applied thereto. Fig. 2 is an enlarged longitudinal sectional view of the reel. Fig. 3 is a sectional view taken on the line 3—3 of Fig. 2. Fig. 4 is an end elevation of the opposite end of the reel. Fig. 5 is a sectional view on the line 5—5 of Fig. 2. Fig. 6 is a detailed view of the reel shaft and spring case. Fig. 7 is a detailed perspective view of the line holder and actuating lever. Fig. 8 is a similar view of a ratchet sleeve employed in connection with the device. Fig. 9 is a perspective view of a catch employed with the device.

Referring to the drawings in detail, there is shown a fish pole 10 having a handle 11 to which my improved reel is adapted to be attached, said reel comprising a shaft 12 which is rotatably mounted in the end plates 13 and 14, the latter of which are connected and spaced apart in proper relation by means of connecting braces 15 secured at their ends by means of screws 16 to the said respective plates. It will be observed that the braces 15 are secured to the end plates 13 and 14 through the medium of peripheral lugs 17 which have threaded apertures to receive the said screws, the two lower braces serving to hold the attachment plate 18 through the medium of the ears 18' and the uppermost brace serving to receive an actuating lever as will be hereinafter described.

As will be clearly seen in Fig. 6 of the drawings, one end of the reel shaft 12 is reduced in size as shown at 19 to form a shoulder 20 against which a concavo-convex rim 21 is retained upon the reduced portion which extends through the plate 13 and carries a pinion 22. A cover plate 23 is secured to the plate 13 by screws 24 and also serves as a mounting for a shaft 25 which carries a larger pinion 26 adapted to mesh with a pinion 22 and which is capable of rotation by means of a hand crank 27, whereby rotation may be imparted to the reel shaft for winding the fish line 28 thereon. The opposite end of the shaft 12 is also provided with a reduced portion 29 which is provided with a similarly formed rim 30 having an extension 31 forming a case to receive a coiled band spring 32. The end portion 29 of the reel shaft is also rotatably mounted in the plate 14 and carries a sleeve 33, which upon its outer end is provided with ratchet teeth 34 and which is loosely mounted on the shaft, said sleeve carrying a fastening screw 35, one end of the spring 32 being secured to the said screw and the other end being fastened to the portion 31 of the case as shown at 36. A pawl 37 is pivotally mounted at 38 upon an end wall 14 forming part of the spring case and the intermediate portion of the pawl is connected to a catch 41 by a pin 42 through the end plate 14, said catch being pivoted by means of a pin 43, whereby movement of the catch 41 upon its pivot 43 will actuate the said pawl, forward movement of the catch causing the sharpened end of the pawl to engage in the teeth 34 to prevent rotation of the sleeve and unwinding of the spring and opposite movement of the catch rearwardly, causing the disengagement of the pawl with the teeth. The pin 42 is movable through a slot 44 in the plate 14 to permit such actuation and the upper end of the catch is bent rearwardly as shown at 45 and adapted to be engaged by the thumb, while the hooked end 46 of the line holder and releasing lever 47 is adapted to engage the tapered head of the rivet 36 to hold the spring when wound by a rearward movement of the crank 27. This lever 47 is coiled around the upper brace member connecting the end plates 13 and 14 as shown at 48 and is adapted for free pivotal movement thereon, the shorter arm of the lever terminating in the hooked portion 46 which is directed outwardly at right angles for engagement with the rivet 36 carried by the case 31 which is keyed to the shaft 12 and the longer arm of the lever is formed with an open eye 49 through which the line 28 is adapted to be passed when the line has been extended and the bait cast. Thus it will be seen that the shaft 12 may be rotated to wind the line 28 thereon when the pawl 37 is disengaged from the teeth 34 of the sleeve 33. In order to wind the spring 32, the pawl 37 is moved into engagement with the teeth 34 to anchor the end of the spring which is attached to the sleeve and the crank 27 is rotated to impart such motion to the end of the spring secured to the case as shown at 36.

In the use of the device, the line 28 is extended through the open eye 49 with the spring in a wound position and pawl 37 in engagement with the teeth 34 and with the parts in this position, a hooked end 46 of the lever 47 is engaged with the rivet 36 to hold the spring from unwinding after holding the pawl in position by moving the catch 41 forwardly to engage the pawl 37 with the teeth 34, and when pull is exerted upon the line by the fish in biting at the bait, the said hook 46 is disengaged from the rivet 36 to release the case 31 and allowing the spring to instantaneously unwind and rotate the shaft to wind a portion of the line thereon. When the spring has been unwound, the catch 41 is moved rearwardly causing the pin 42 to operate within the slot 44 and thereby disengage the pawl 37 from the teeth 34 of the sleeve 33 so that the line may be further wound upon the reel shaft between the casing parts 21 and 30 and inasmuch as the said sleeve is loose on the shaft, the spring and sleeve will rotate with the case through the medium of its connection with the portion 31 without winding the spring. It will thus be seen that the operation of catching the fish is instantaneous upon the exertion or pull upon the line and the device being comparatively simple in structure, may be applied to reels now generally in use or manufactured in such form in an inexpensive manner.

I claim:—

1. A fishing reel comprising a shaft, end plates suitably braced and rotatably receiving the ends of the shaft, means for manually rotating the shaft to wind the line thereon, a case on one end of the shaft, a sleeve also mounted on the shaft, a resilient member connecting the case and sleeve, means for holding the resilient member under tension and a lever adapted to hold said means in such position, said lever receiving the line and adapted to release the resilient member for actuation of the shaft when pull is exerted upon the line.

2. A fishing reel comprising end plates, braces connecting the end plates, a shaft rotatably mounted in the end plates, a hand crank having geared connections with the shaft, rims mounted upon the shaft, one of said rims having a flanged portion forming a casing, a ratchet sleeve mounted on the shaft within the case, a coiled spring connecting the sleeve and case, a pawl pivoted on the case and adapted to engage the teeth of the sleeve, a catch adapted to actuate the pawl and a lever mounted upon one of the braces, one end of the lever engaging the case and the other end adapted to receive a line wound on the drum, whereby pull exerted on the line will release the end of the lever from engagement with the case to permit winding of the shaft under the tension of the spring.

In testimony whereof, I affix my signature, in presence of two witnesses.

STANLEY KADLA.

Witnesses:
B. LONGMORE,
J. A. MURDOCH.